(12) United States Patent
Wu et al.

(10) Patent No.: US 11,377,828 B2
(45) Date of Patent: Jul. 5, 2022

(54) SOCKET DEVICE

(71) Applicant: Xiamen Solex High-Tech Industries Co., Ltd., Xiamen (CN)

(72) Inventors: Shilong Wu, Xiamen (CN); Wenxing Chen, Xiamen (CN); Fengde Lin, Xiamen (CN)

(73) Assignee: Xiamen Solex High-Tech Industries Co., Ltd., Xiamen (CN)

( * ) Notice: Subject to any disclaimer, the term of this patent is extended or adjusted under 35 U.S.C. 154(b) by 137 days.

(21) Appl. No.: 16/820,681

(22) Filed: Mar. 16, 2020

(65) Prior Publication Data
US 2020/0291626 A1 Sep. 17, 2020

(30) Foreign Application Priority Data
Mar. 14, 2019 (CN) .......................... 201910193329.7

(51) Int. Cl.
| | |
|---|---|
| *E03C 1/02* | (2006.01) |
| *F16L 41/02* | (2006.01) |
| *B05B 1/18* | (2006.01) |
| *B05B 15/62* | (2018.01) |
| *B05B 1/16* | (2006.01) |
| *F16K 11/065* | (2006.01) |

(52) U.S. Cl.
CPC ............ *E03C 1/023* (2013.01); *B05B 1/1618* (2013.01); *B05B 1/1681* (2013.01); *B05B 1/185* (2013.01); *B05B 15/62* (2018.02); *F16K 11/065* (2013.01); *F16L 41/023* (2013.01); *Y10T 137/86879* (2015.04); *Y10T 137/87788* (2015.04)

(58) Field of Classification Search
CPC ...... E03C 1/0408; E03C 1/06; E03C 2201/30; E03C 1/023; B05B 1/185; B05B 15/62; B05B 1/1618; B05B 1/1681; F16K 11/065; F16K 11/0445; F16K 31/52416; Y10T 137/86879; Y10T 137/87788
See application file for complete search history.

(56) References Cited

U.S. PATENT DOCUMENTS

| | | | | |
|---|---|---|---|---|
| 7,299,510 | B2 * | 11/2007 | Tsai ........................ | E03C 1/023 |
| | | | | 239/283 |
| 7,373,954 | B2 * | 5/2008 | Zhadanov ........... | F16K 11/0853 |
| | | | | 137/625.47 |
| 10,751,737 | B2 * | 8/2020 | Lu ........................... | E03C 1/023 |
| 11,028,564 | B2 * | 6/2021 | Ball ......................... | E03C 1/06 |

(Continued)

*Primary Examiner* — Atif H Chaudry
(74) *Attorney, Agent, or Firm* — Cooper Legal Group, LLC

(57) ABSTRACT

The present disclosure discloses a socket device comprising a fixing portion. The fixing portion comprises a socket portion, a water inflow passage, a first water outflow passage, a second water outflow passage, a first switching mechanism, a first water dividing passage, and a first control mechanism. The socket portion comprises a switch. The second water outflow passage, the first water outflow passage and the second water outflow passage are switched to be connected to the water inflow passage by the first switching mechanism. The switch is connected to the first switching mechanism to drive the first switching mechanism. The first control mechanism is configured to control the water inflow passage to be connected to the first water dividing passage or control the first water dividing passage to be opened or to be closed.

19 Claims, 13 Drawing Sheets

(56) References Cited

U.S. PATENT DOCUMENTS

| | | | |
|---|---|---|---|
| 2009/0200400 A1* | 8/2009 | Lin | B05B 1/18 239/391 |
| 2012/0325353 A1* | 12/2012 | Zhou | B05B 1/1618 137/625 |
| 2021/0245178 A1* | 8/2021 | Rogers | B05B 1/3013 |

* cited by examiner

SOCKET DEVICE

RELATED APPLICATIONS

This application claims priority to Chinese Patent Application 201910193329.7, filed on Mar. 14, 2019, which is incorporated herein by reference.

FIELD OF THE DISCLOSURE

The present disclosure relates to a fixed portion in the sanitary field, and in particular relates to a socket device having a water passage switching function.

BACKGROUND OF THE DISCLOSURE

A traditional sanitary device, such as a household shower, comprises a switching valve, a fixed shower, a handheld shower, and a fixed portion. The switching valve has a water inflow passage and two outflow passages. The two outflow passages are respectively connected to the fixed shower and the handheld shower. The switching valve controls the fixed shower head or the handheld shower to discharge water. The fixed portion comprises a plug portion in which the handheld shower is inserted. The shower has the following shortcomings: 1. the switching valve and the fixed portion are separate, thereby occupying a large amount of space and making the shower inconvenient to install, and 2. it is necessary to manually control the waterway switching, which is inconvenient to use.

In view of the above deficiencies, some solutions have been proposed. For example, in the Chinese application number CN201088942Y, a plug-in shower switch device is provided that comprises an inlet and two outlets on a fixed portion. The two outlets are respectively connected with a shower hose, and an outlet pipe of a top spray shower, and a movable switching bolt is provided between the two outlets. An elastic front end of the movable switching bolt protrudes into a sleeve in the front of the fixed portion. The proposed shower integrates the fixed portion and the switching valve, and the switching value switches when the handheld shower to inserted into or pulled out of the fixed portion. When the handheld shower is pulled out of the fixed portion, water flows out of the handheld shower. When the handheld shower is inserted into the fixed portion, water flows out of the fixed shower. Although the above technical problems are solved, the proposed shower also brings new technical problems. For example, when the user inserts the handheld shower into the fixed portion, water flows out of the fixed shower, but no water flows out of the handheld shower. In actual use, the handheld shower may also be needed at this time, so the functions of the proposed shower are limited.

BRIEF SUMMARY OF THE DISCLOSURE

The present disclosure provides a socket device to solve deficiencies of the existing techniques.

In order to solve the aforementioned technical problems, a first technical solution of the present disclosure is as follows.

A socket device comprises a fixing portion. The fixing portion comprises a socket portion, a water inflow passage, a first water outflow passage, a second water outflow passage, a first switching mechanism, a first water dividing passage, and a first control mechanism. The socket portion comprises a switch. The first switching mechanism is connected to the water inflow passage, the first water outflow passage, and the second water outflow passage, the first water outflow passage and the second water outflow passage are switched to be connected to the water inflow passage by the first switching mechanism. The switch is connected to the first switching mechanism to drive the first switching mechanism. The first water dividing passage is connected to the water inflow passage and the first water outflow passage, and the first control mechanism is configured to control the water inflow passage to be connected to the first water dividing passage or control the first water dividing passage to be opened or to be closed.

In another preferred embodiment, the first switching mechanism comprises a first sliding portion slidably disposed in the fixing portion, and the first water outflow passage and the second water outflow passage are switched by the first sliding portion to be connected to the water inflow passage.

In another preferred embodiment, the first switching mechanism further comprises a first sealing ring fixedly disposed on the first sliding portion. A first inlet of the first water outflow passage and a second inlet of the second water outflow passage are disposed at intervals and face each other. The water inflow passage is disposed between the first inlet and the second inlet, the first sealing ring is disposed between the first inlet and the second inlet and corresponds to the first inlet and the second inlet. When the first sealing ring seals one of the first inlet or the second inlet, the other of the first inlet or the second inlet is connected to the water inflow passage.

In another preferred embodiment, the switch comprises a movable member movably connected to the socket portion. The movable member is coupled to the first switching mechanism. When a handheld assembly is inserted into the socket portion or when the handheld assembly is pulled out from the socket portion, the movable member moves relative to the socket portion to trigger the first switching mechanism.

In another preferred embodiment, the first switching mechanism comprises a first sliding portion slidably disposed in the fixing portion, the first water outflow passage and the second water outflow passage are switched by the first sliding portion to be connected to the water inflow passage. The switch comprises a movable member movably connected to the socket portion, the movable member is coupled to the first sliding portion. When a handheld assembly is inserted into the socket portion or when the handheld assembly is pulled out from the socket portion, the movable member moves relative to the socket portion to trigger the first sliding portion to slide.

In another preferred embodiment, the movable member is swingably connected to the socket portion, and the movable member abuts against the first switching mechanism to push the first switching mechanism to slide.

In another preferred embodiment, the fixing portion is further slidably connected to a push block, and the push block abuts between the first switching mechanism and the movable member.

In another preferred embodiment, the socket portion defines a socket space. The movable member moves relative to the socket portion between a pull-out position and an inserted position. When the movable member is at the pull-out position, the movable member at least partially protrudes into the socket space.

In another preferred embodiment, a first elastic body is disposed between the first switching mechanism and the fixing portion. The first elastic body accumulates energy when a handheld assembly is inserted into the socket portion. When the handheld assembly is pulled out from the socket portion, the first elastic body releases the energy to reset the first switching mechanism.

In another preferred embodiment, the first control mechanism comprises a control valve and an operating mechanism. The control valve is disposed in the first water dividing passage to prevent water from flowing backward into the water inflow passage. The operating mechanism is drivably connected the control valve and is configured to open the control valve.

In another preferred embodiment, the operating mechanism comprises an operating portion and a second sliding portion configured to be slidable relative to the fixing portion. The operating portion is movably connected to the fixing portion. The operating portion is drivably connected to the second sliding portion, and the second sliding portion is drivably connected to the control valve.

In another preferred embodiment, the control valve comprises a spool movable relative to the fixing portion and a third elastic body abutting the spool, the spool controls the first water dividing passage to be opened and to be closed. The operating mechanism is connected to the spool.

In another preferred embodiment, a second elastic body is disposed between the fixing portion and the second sliding portion and abuts the second sliding portion.

In another preferred embodiment, a first inlet of the first water outflow passage and a second inlet of the second water outflow passage are disposed at intervals and face each other. The water inflow passage is disposed between the first inlet and the second inlet. The first water dividing passage comprises a third inlet. A group of the first inlet and the second inlet, and the third inlet are disposed along the water inflow passage at intervals.

In another preferred embodiment, the fixing portion further comprises a second water dividing passage. The second water dividing passage is connected to the water inflow passage and the second water outflow passage. The first control mechanism switches the first water dividing passage or the second water dividing passage to connect to the water inflow passage.

In another preferred embodiment, the first control mechanism comprises a second switching mechanism and an operating portion. The second switching mechanism is connected to the first water dividing passage, the second water dividing passage and the water inflow passage. The operating portion is drivably connected to the second switching mechanism.

In another preferred embodiment, the second switching mechanism comprises a second sliding portion configured to be slidable relative to the fixing portion. The operating portion is drivably connected to the second sliding portion. The first water dividing passage and the second water dividing passage are switched to be connected to the water inflow passage by a sliding movement of the second sliding portion.

In another preferred embodiment, the second switching mechanism further comprises a second sealing ring fixedly disposed on the second sliding portion. A third inlet of the first water dividing passage and a fourth inlet of the second water dividing passage are disposed at intervals and face each other. The water inflow passage is disposed between the third inlet and the fourth inlet, the second sealing ring is disposed between the third inlet and the fourth inlet. When the second sealing ring seals one of the third inlet or the fourth inlet, the other of the third inlet or the fourth inlet is connected to the water inflow passage.

In another preferred embodiment, a second elastic body is disposed between the second switching mechanism and the fixing portion.

In another preferred embodiment, a first inlet of the first water outflow passage and a second inlet of the second water outflow passage are disposed at intervals and face each other. The water inflow passage is disposed between the first inlet and the second inlet. A third inlet of the first water dividing passage and a fourth inlet of the second water dividing passage are disposed at intervals and face each other, the water inflow passage is located between the third inlet and the fourth inlet, a group of the first inlet and the second inlet and a group of the third inlet and the fourth inlet are dispose along the water inflow passage at intervals.

In another preferred embodiment, the first switching mechanism comprises a first sliding portion slidably disposed in the fixing portion. The first water outflow passage and the second water outflow passage are switched by the first sliding portion to be connected to the water inflow passage. The first sliding portion and the second sliding portion are arranged in parallel.

In another preferred embodiment, the operating portion is rotatably connected to the fixing portion. An inner surface of the operating portion comprises a guiding surface. A first end of the second sliding portion abuts the guiding surface, the operating portion rotates to drive the guiding surface to rotate to push the second sliding portion to slide.

In another preferred embodiment, the socket portion and the operating portion are respectively disposed on opposite ends of the fixing portion.

In another preferred embodiment, the fixing portion further comprises a second water dividing passage. The socket device further comprises a second control mechanism configured to control the second water dividing passage to be connected to the water inflow passage.

In another preferred embodiment, the socket portion comprises a sleeve hole. The sleeve hole surrounds an outside of the fixing portion. An inner side of the sleeve hole comprises a gear. An elastic ring surrounds an outer side of the fixing portion. The elastic ring and the gear cooperate to dampen the socket portion and the fixing portion.

In another preferred embodiment, the socket portion is pivotably connected to the fixing portion and is configured to be rotated in a preset angle. The switch comprises a movable member movably connected to the socket portion. The fixing portion is further slidably connected with a push block, the push block abuts between the first switching mechanism and the movable member. The movable member always corresponds to the push block when the socket portion is rotated within the preset angle.

In order to solve the technical problems, a second technical solution of the present disclosure is as follows:

A socket device comprises a fixing portion. The fixing portion comprises a socket portion. The socket portion comprises a sleeve hole, the sleeve hole surrounds an outside of the fixing portion. An inner side of the sleeve hole comprises a gear, an elastic ring surrounds an outer side of the fixing portion, and the elastic ring and the gear cooperate to dampen the socket portion and the fixing portion.

Compared with existing techniques, the technical solution of the present disclosure has the following advantages.

When water flow out from the second water outflow passage, the control mechanism can also control the first water dividing passage to be connected to the water inflow passage to control water to flow out from the first water outflow passage. The present disclosure skillfully combines the automatic switching and the actual demand. An occupied space of the socket device is small, and the structure is compact.

The first switching mechanism comprises a first sliding portion configured to slide relative to the fixing portion, and the two outflow passages are switched by the first sliding portion to be connected to the water inflow passage. The connection is simple, and the structure is simple.

The movable member is swingably connected to the socket portion, and the movable member abuts the first switching mechanism to push the first switching mechanism to slide. The structure is compact, and a control of the switch movement comprises a high accuracy.

The first inlet and the second inlet of the two water outflow passages are disposed at intervals and face each other, the water inflow passage is disposed between the first inlet and the second inlet, and the sealing ring is disposed between the first inlet and the second inlet and cooperates with the first inlet and the second inlet. The structure is simple and compact.

A push block is also slidably connected in the fixing portion, and the push block abuts between the first switching mechanism and the movable member to improve a stability and a reliability of the connection.

The control mechanism comprises a control valve and an operating mechanism disposed on the first water dividing passage to prevent water from flowing backward to the water inflow passage, and the operating mechanism drivably connected to the control valve to cause the control valve to be opened to prevent water from flowing back into the water inflow passage to ensure a switching of water passages to be stable and reliable.

The operating mechanism be movably connected to the fixing portion, the operating portion is drivably connected to the second sliding portion, and the second sliding portion is drivably connected to the control valve. The switching is convenient.

A second elastic body that abuts the second sliding portion is disposed between the fixing portion and the second sliding portion to improve a reliability of the reset.

A second water dividing passage is further disposed on the fixing portion, and the second water dividing passage is connected to the water inflow passage and the second water outflow passage, and the control mechanism switches the first water dividing passage and the second water dividing passage to be connected to the water inflow passage to further improve a flexibility of the switching of the water passages.

BRIEF DESCRIPTION OF THE DRAWING

The present disclosure will be further described below with the combination of the accompanying drawings and the embodiments.

DETAILED DESCRIPTION OF THE EMBODIMENTS

Embodiment 1

Figure 1:
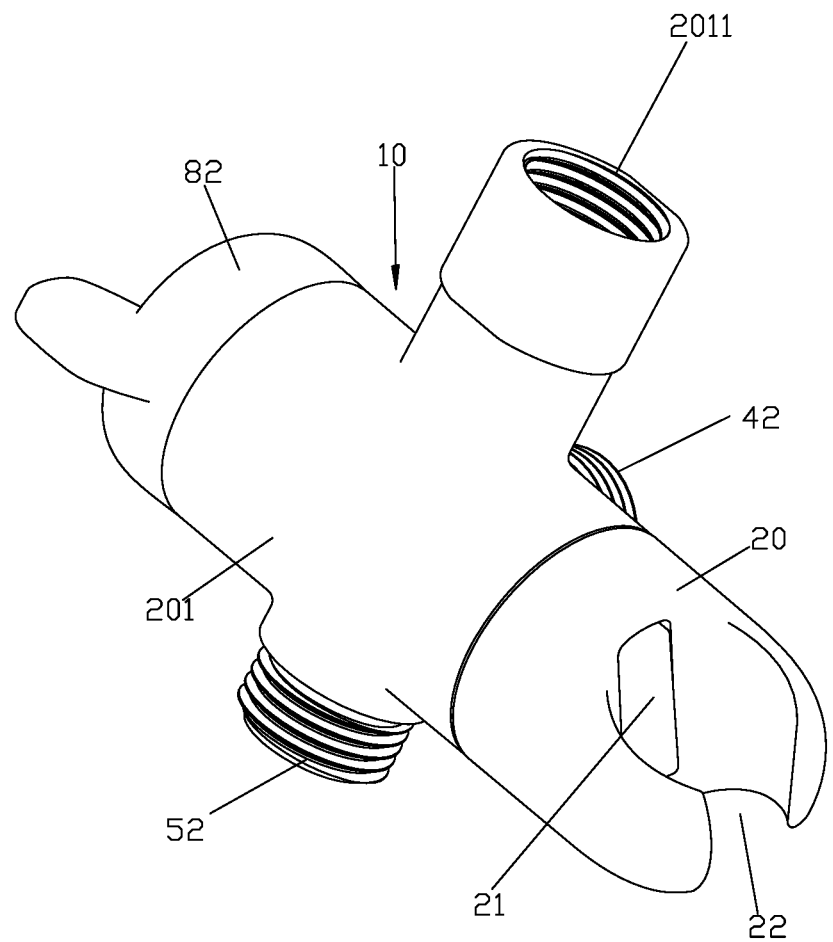
FIG. 1 illustrates a perspective view of a socket device of Embodiment 1 of the present disclosure.
Figure 2:
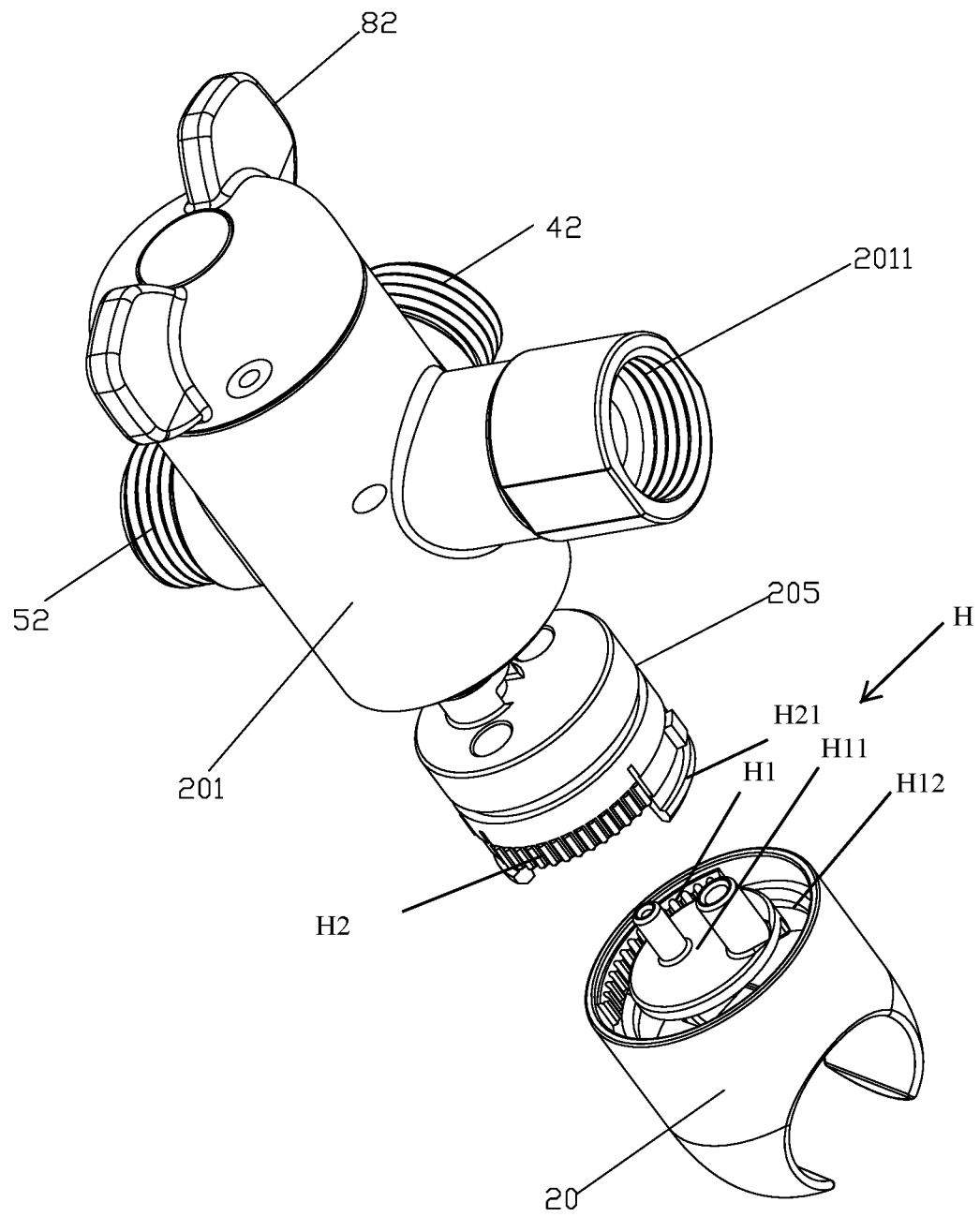
FIG. 2 illustrates a first exploded perspective view of the socket device of Embodiment 1 of the present disclosure.
Figure 3:
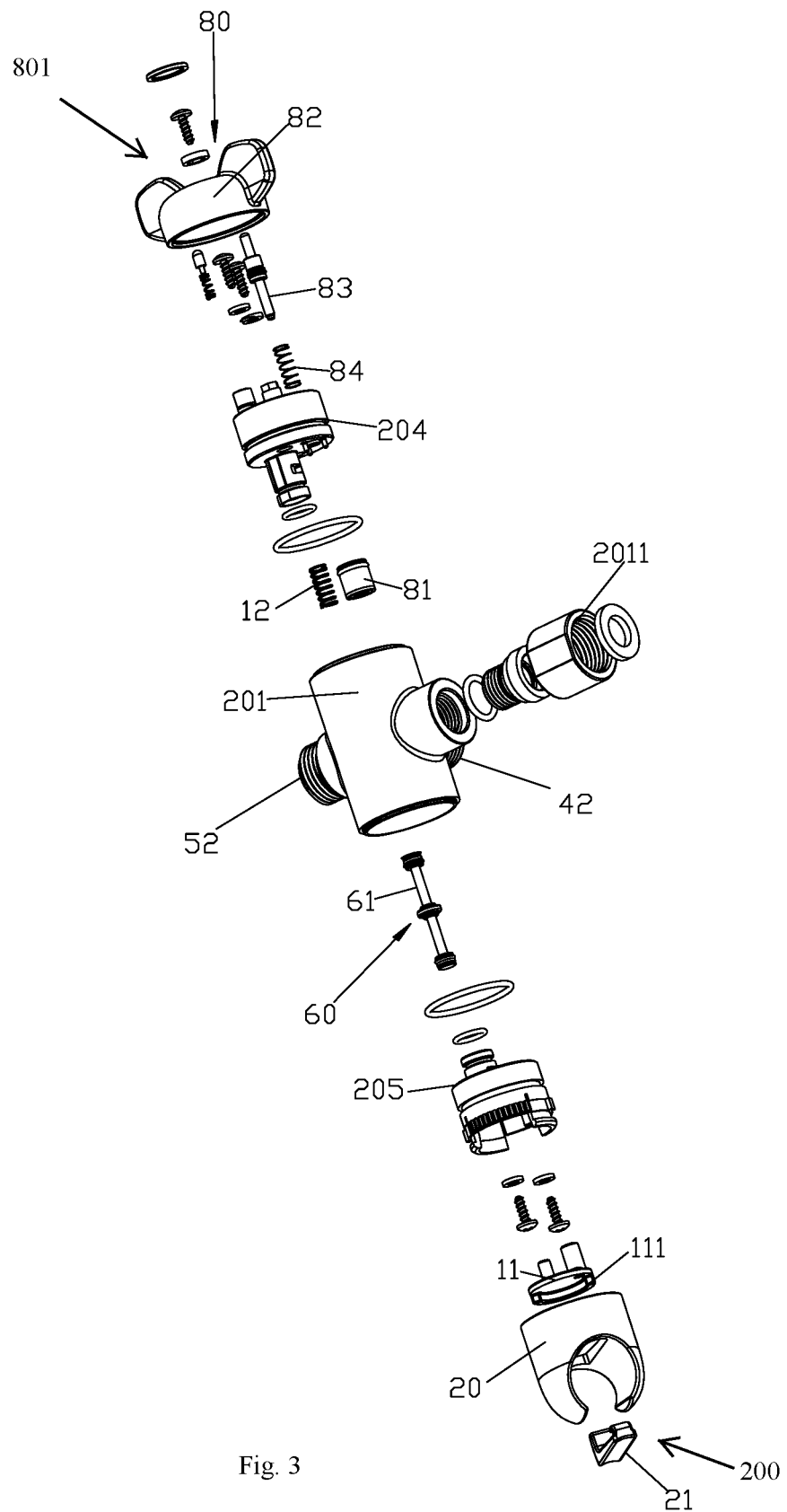
FIG. 3 illustrates a second exploded perspective view of the socket device of Embodiment 1 of the present disclosure.
Figure 4:
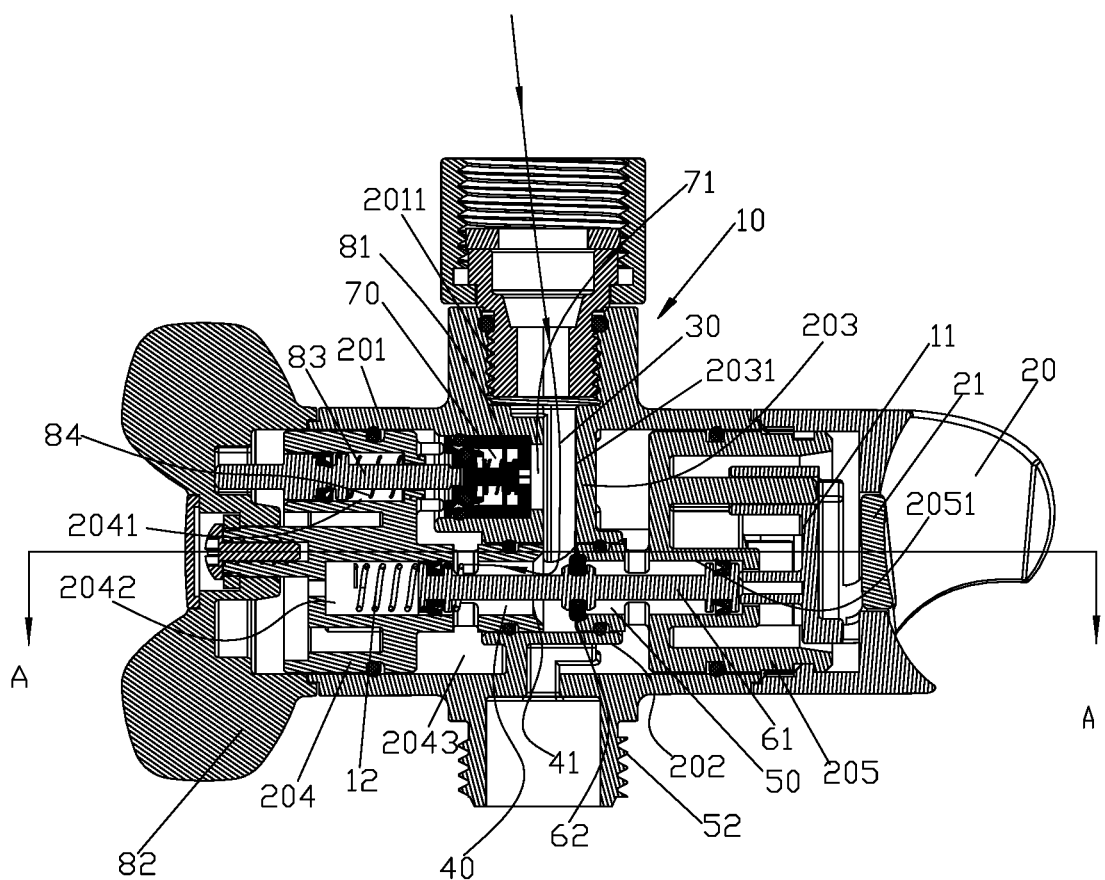
FIG. 4 illustrates a cross-sectional view of the socket device of Embodiment 1 of the present disclosure when a handheld assembly is pulled out from a socket portion of the socket device (the handheld assembly is not shown in FIG. 4).
Figure 5:
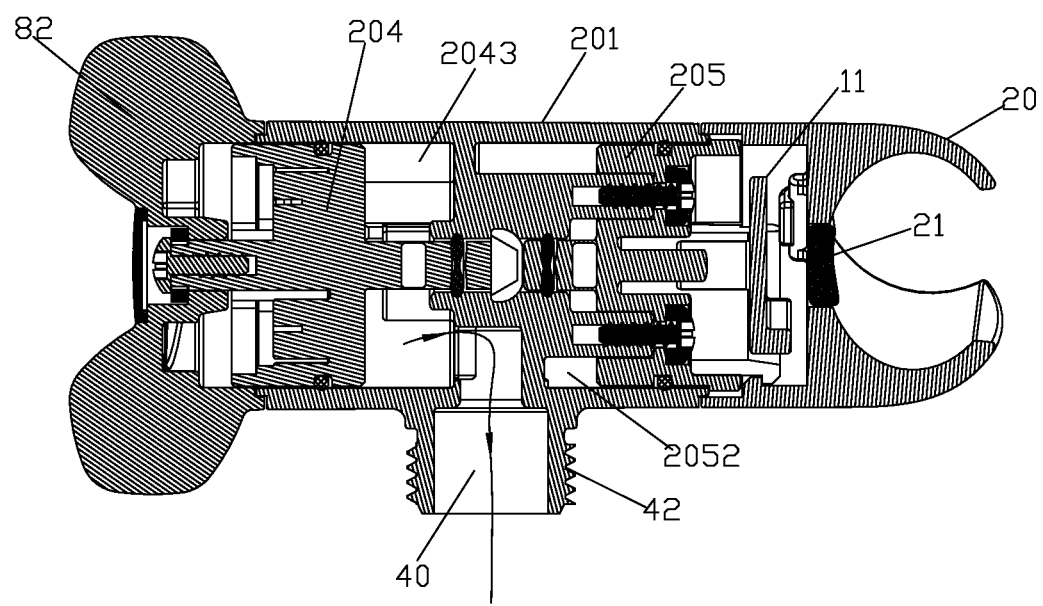
FIG. 5 illustrates a cross-sectional view taken along line A-A of FIG. 4.
Figure 6:
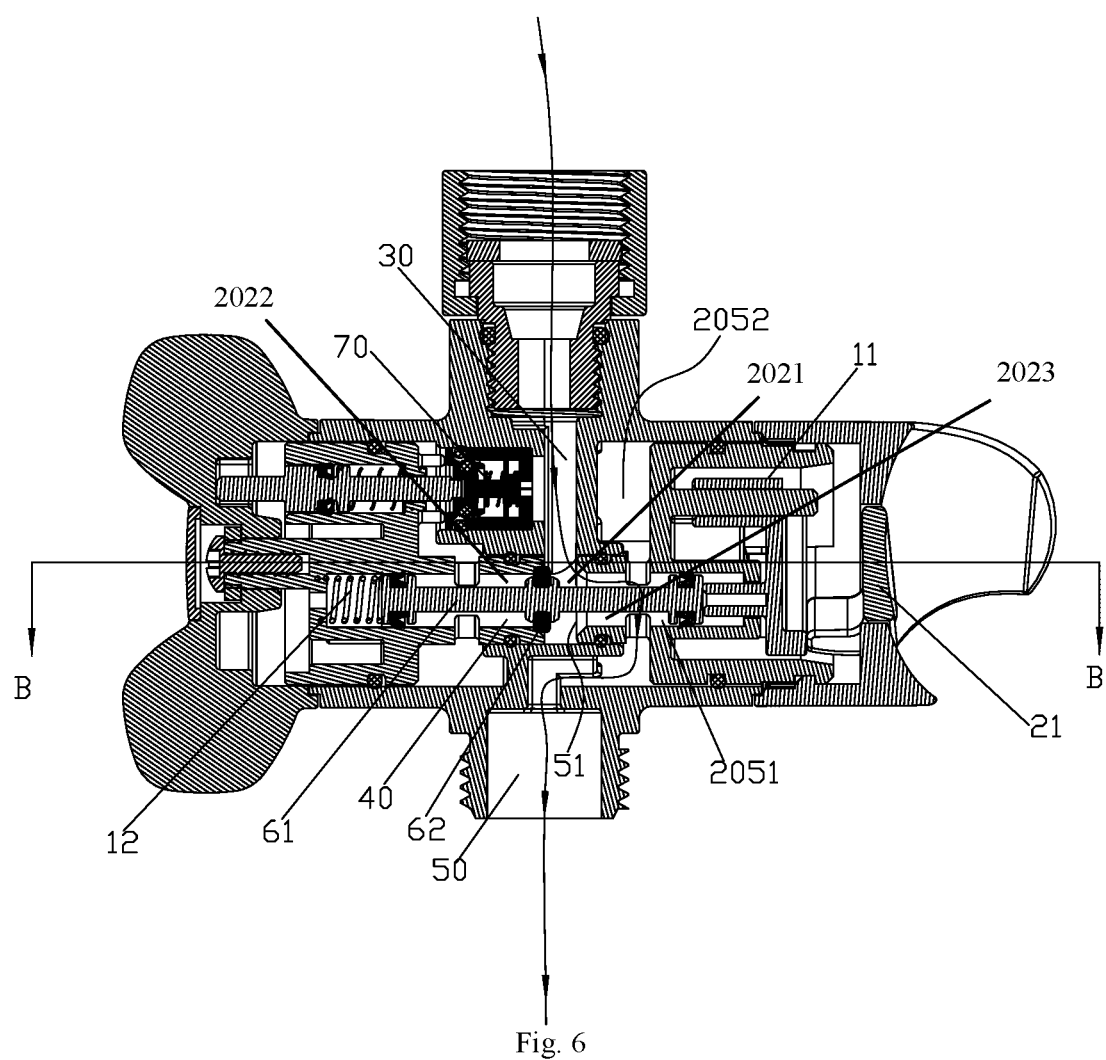
FIG. 6 illustrates a cross-sectional view of the socket device of Embodiment 1 of the present disclosure when the handheld assembly is inserted into the socket portion of the socket device (the handheld assembly is not shown in FIG. 6).
Figure 7:
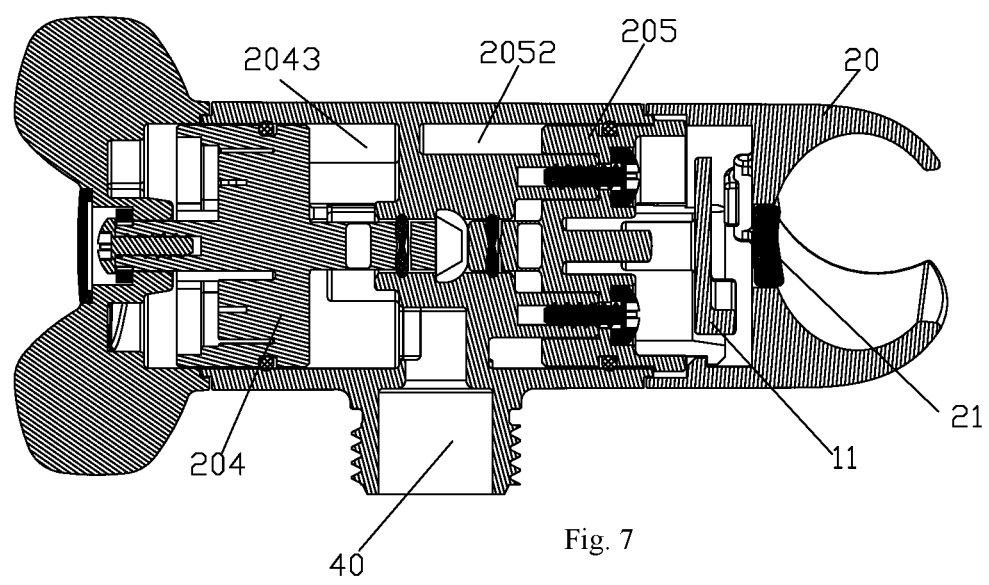
FIG. 7 illustrates a cross-sectional view taken along line B-B of FIG. 6.
Figure 8:
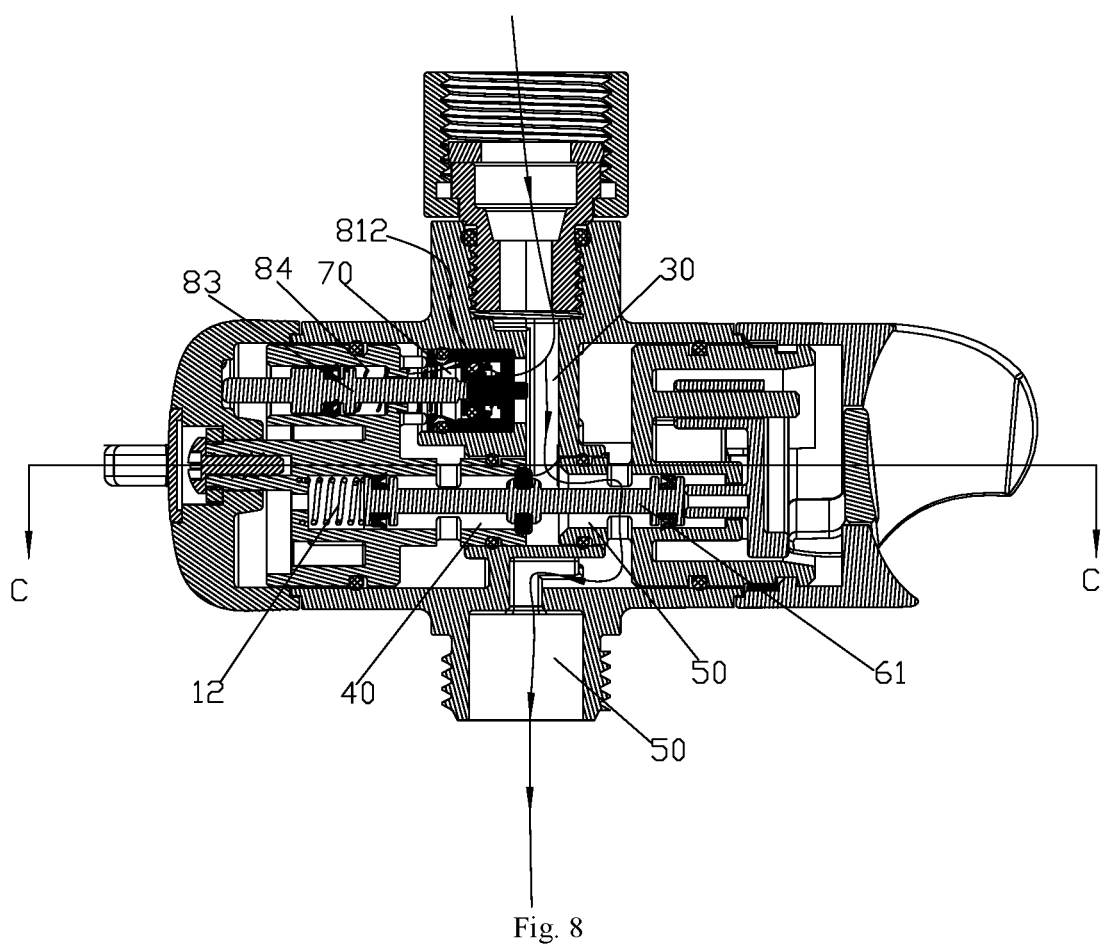
FIG. 8 illustrates a cross-sectional view of the socket device according to Embodiment 1 of the present disclosure when water flows out from a top spray shower and a handheld shower synchronously.
Figure 9:
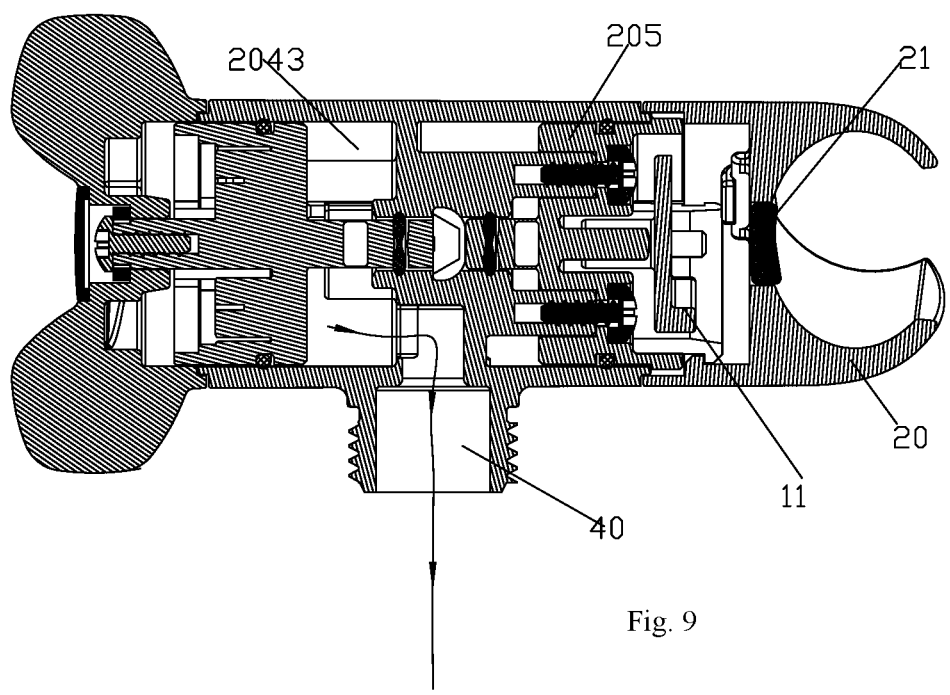
FIG. 9 illustrates a cross-sectional view taken along line C-C of FIG. 8.
Figure 10:
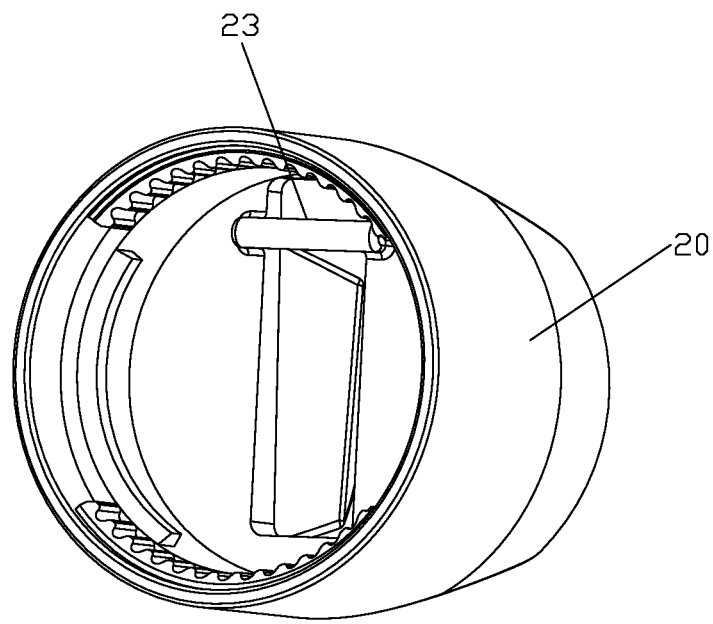
FIG. 10 illustrates a perspective view of an operating portion of the socket device of Embodiment 1 of the present disclosure.
Figure 11:
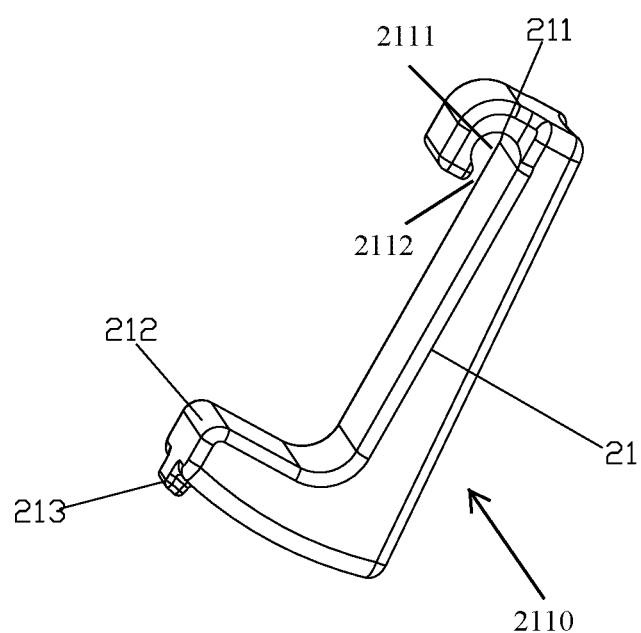
FIG. 11 illustrates a perspective view of the socket portion of the socket device of Embodiment 1 of the present disclosure.
Figure 12:
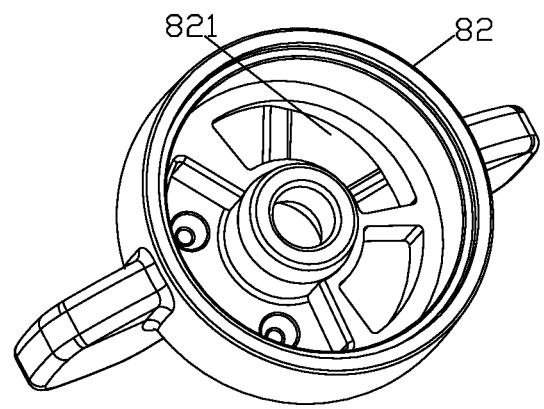
FIG. 12 illustrates a perspective view of a movable member of the socket device of Embodiment 1 of the present embodiment.
Figure 12A:
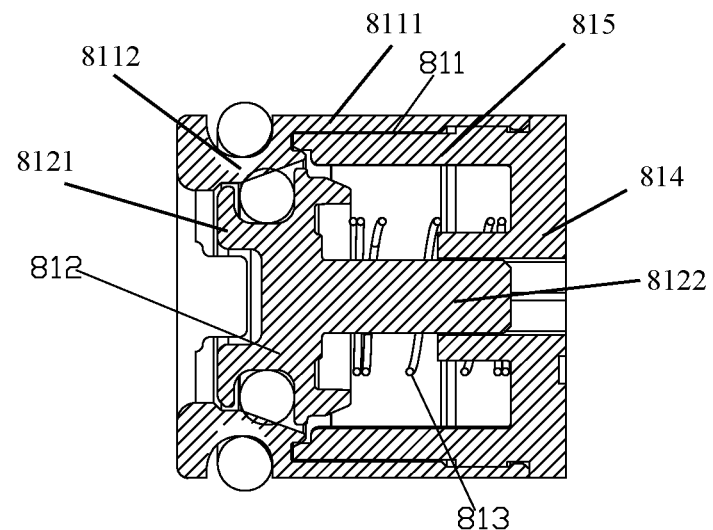
FIG. 12A illustrates a cross-sectional schematic view of a control valve.
Figure 12B:
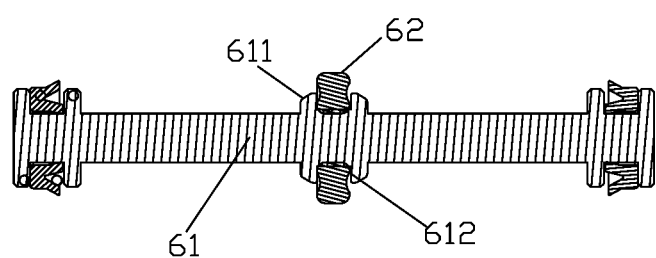
FIG. 12B illustrates a cross-sectional schematic view of a first sliding portion.

Referring to FIGS. 1-12B, a socket device comprises a fixing portion 10. The fixing portion 10 comprises a socket portion 20, a water inflow passage 30, a first water outflow passage 40, a second water outflow passage 50, a first switching mechanism 60, a first water dividing passage 70, and a first control mechanism 80. The socket portion 20 comprises a switch 200. The first switching mechanism 60 is connected to the water inflow passage 30, the first water outflow passage 40, and the second water outflow passage 50. The first water outflow passage 40 and the second water outflow passage 50 are switched to be connected to the water inflow passage 30 by the first switching mechanism 60. The switch 200 is connected to the first switching mechanism 60 to drive the first switching mechanism 60 to enable switching when a handheld assembly is inserted into the socket portion 20 or the handheld assembly is pulled out from the socket portion 20. The first water dividing passage 70 is connected to the water inflow passage 30 and the first water outflow passage 40. The first control mechanism 80 is configured to control the water inflow passage 30 to be connected to the first water dividing passage 70 or control the first water dividing passage 70 to be opened and to be closed. That is, there are two water outflow modes of the first water outflow passage 40. In a first water outflow mode of the two water outflow modes, the first water outflow passage 40 is switched to be connected to the water inflow passage 30 by the first switching mechanism 60. At this time, water flowing from the water inflow passage 30 directly flows into the first water outflow passage 40 and flows out from the first water outflow passage 40. If the first water outflow passage 40 is connected to a handheld shower, water flows out from the handheld shower. In a second water outflow mode of the two water outflow modes, the first control mechanism 80 is opened to be connected to the water inflow passage 30. At this time, water flowing from the water inflow passage 30 flows into the first water outflow passage 40 through the first water dividing passage 70, water flows through the water inflow passage 30, the first water dividing passage 70, and the first water outflow passage 40, and flows out from the handheld shower.

The first switching mechanism 60 comprises a first sliding portion 61 and a first sealing ring 62. The first sliding portion 61 is slidably disposed in the fixing portion 10, and the first sealing ring 62 is fixedly disposed on the first sliding portion 61. A first inlet 41 of the first water outflow passage 40 and a second inlet 51 of the second water outflow passage 50 are disposed at intervals and face each other. The water inflow passage 30 is disposed between the first inlet 41 and the second inlet 51. The first sealing ring 62 is disposed between the first inlet 41 and the second inlet 51 and corresponds to the first inlet 41 and the second inlet 51. When the first sealing ring 62 seals one of the first inlet 41 or the second inlet 51, the other of the first inlet 41 or the second inlet 51 is connected to the water inflow passage 30. That is, when one of the first inlet 41 of the first water outflow passage 40 or the second inlet 51 of the second water outflow passage 50 is closed, the other of the first inlet 41 of the first water outflow passage 40 or the second inlet 51 of the second water outflow passage 50 is connected to the water inflow passage. That is, the first sliding portion 61 slides to drive the first sealing ring 62 to move to be seal with one of the first inlet 41 or the second inlet 51. In this way, the first water outflow passage 40 and the second water outflow passage 50 are switched to be connected to the water inflow passage 30 due to a sliding movement of the first sliding portion 61. In a specific structure, the first sliding portion 61 comprises a sliding bar 613, and a middle portion of the sliding bar 613 comprises a ring shoulder 611 extending outward. The ring shoulder 611 comprises an assembly groove 612 extending inward. The first sealing ring 62 is fixedly disposed in the assembly groove 612.

A structure of the socket portion 20 is, for example, a C-shaped structure or a sleeved structure, and the structure of the socket portion 20 is conventional. The switch 200 comprises a movable member 21 movably connected to the socket portion 20, and the movable member 21 is drivably connected to the first sliding portion 61 of the first switching mechanism 60. When the handheld assembly is inserted into the socket portion 20, or when the handheld assembly is pulled out from the socket portion 20, the movable member 21 moves relative to the socket portion 20 to trigger the first sliding portion 61 to slide. The handheld assembly is, for example, a handheld shower. A first elastic body 12 is disposed between the first sliding portion 61 and the fixing portion 10. The first elastic body 12 accumulates energy when the handheld assembly is inserted into the socket portion 20, and the first elastic body 12 releases the energy to reset the first switching mechanism 60 when the handheld assembly is pulled out from the socket portion 20. In the embodiment, the movable member 21 is swingably connected to the socket portion 20, and the movable member 21 abuts the first sliding portion 61 to push the first sliding portion 61 to slide. For example, the socket portion 20 defines a socket space 22. The movable member 21 moves relative to the socket portion 20 between a pull-out position or an inserted position. When the movable member 21 is at the pull-out position, the movable member 21 at least partially protrudes into the socket space 22. The movable member 21 is triggered, for example, firstly, when the handheld assembly is inserted into the socket portion 20, the handheld assembly triggers the movable member 21, a second end of the movable member 21 moves away from the socket space 22, secondly, when the handheld assembly is pulled out from the socket portion 20, the second end of the movable member 21 moves towards the socket space 22 to protrude into the socket space 22. Preferably, a push block 11 is slidably connected to the fixing portion 10, and the push block 11 abuts between the first sliding portion 61 and the movable member 21. In a specific structure, a first end of the movable member 21 comprises a connecting portion 2110, and the connecting portion 2110 comprises a hook 211 comprising an opening 2112 and a body 2111. A size of the opening is smaller than a size of the body. The socket portion 20 comprises a hanging shaft 23. After the hook 211 is engaged with the hanging shaft 23, the body of the hook 211 is pivotally connected to the hanging shaft 23. A first end of the movable member comprises a first abutting portion 212, and the first abutting portion 212 abuts the first sliding portion 61. When the handheld assembly is inserted to the socket portion 20 to drive the movable member 21 to swing, a swinging movement of the movable member 21 drives the first abutting portion 212 to push the first sliding portion 61 to slide. When the handheld assembly is pulled out, the first elastic body 12 abuts the first sliding portion 61 to be reset, which then drives the movable member 21 to be reset. As required, a connection between the movable member 21 and the fixing portion 10 can also be adaptable to other connections, such as a sliding connection. The first elastic body 12 can also be disposed between the movable member 21 and the fixing portion 10. The first elastic body 12 drives the movable member 21 to be reset, and then the movable member 21 pulls the first switching mechanism 60 to slide to be reset (the first switching mechanism 60 is pulled to be connected to the movable member 21, for example, by a push block 11). If the socket portion 20 is pivotally connected the fixing portion 10 and a damper H is disposed between the socket portion 20 and the fixing portion 10, the socket portion 20 is connected to the fixing portion 10 by a clamp in some embodiments to prevent the socket portion 20 from being separated from the fixing portion 10 so as to enable the socket portion 20 to be pivotally connected to the fixing portion 10. Preferably, the socket portion 20 is configured to rotate in a preset angle, and the socket portion 20 can only rotate relative to the fixing portion 10 in the preset angle. The movable member 21 always corresponds to the push block 11 regardless of how the socket portion 20 rotates. For example, the push block 11 comprises a second abutting portion 111. The movable member 21 abuts the second abutting portion 111, and the movable member 21 always abuts the second abutting portion 111 regardless of how the movable member 21 rotates following the socket portion 20. The second abutting portion 111 comprises an arc portion, and a rotation axis of the arc portion and a rotation axis of the socket portion 20 are coaxial. A central angle of the arc portion is not less than the preset angle of the socket portion 20. A structure of the damper H is as follows. The socket portion 20 comprises a sleeve hole H11, and the sleeve hole H11 surrounds an outside of the fixing portion 10. An inner side of the sleeve hole H11 comprises a gear H1, and an elastic arc H2 is disposed on an outer side of the fixing portion 10. The elastic arc H2 is, for example, an O-ring. The elastic arc H2 and the gear H1 cooperate to achieve a damping function. The sleeve hole H11 comprises a lock member H12. The fixed base comprises a fastener H21. The lock member H12 and the fastener H21 cooperate to achieve a clamp connection. By structural design, a circumferential rotation can be realized between the lock member H12 and the fastener H21, but axial movement cannot be realized. That is, the above-mentioned clamp connection and the above-mentioned circumferential rotation are matched. The elastic arc H2 and the gear H1 are to improve stability. Interference by the O-ring and the gear can be reduced relative to an interference of a conventional cooperation of the O-ring and a plane, so as to facilitate assembly. An end of the first abutting portion 212 of the movable member 21 comprises at least one external hook portion 213. The at least one external hook portion 213 abuts an inner wall of the socket portion 20 to prevent the movable member 21 from being separated from the socket portion 20.

The first control mechanism 80 comprises a control valve 81 and an operating mechanism 801. The control valve 81 and the operating mechanism 801 are disposed in the first water dividing passage 70 to prevent water from flowing backward into the water inflow passage 30. The operating mechanism 801 is drivably connected to the control valve 81. The control valve 81 comprises a valve seat 811 fixedly disposed in the first water dividing passage 70, a spool 812 slidably disposed in the valve seat 811 to move relative to the fixing portion 10, and a third elastic body 813 abutting between the spool 812 and the valve seat 811. The spool 812 controls the first water dividing passage 70 to be opened and to be closed, and the operating mechanism 801 drives the spool 812 to control the first water dividing passage 70 to be opened and to be closed. The control valve 81 is, for example, a reverse valve or a check valve, and is configured to prevent water from flowing backward to the water inflow passage 30. The operating mechanism 801 can drive the spool 812 to move so that water flows from the water inflow passage 30 into the first water outflow passage 40 through the first water dividing passage 70. In a specific structure, the valve seat 811 comprises a valve sleeve 8111, a central seat 814, and an annular protrusion 8112 extending inward from an inner circumference of a first end of the valve sleeve 8111 away from the water inflow passage 30. A second end of the valve sleeve 8111 adjacent to the water inflow passage 30 is fixedly disposed to the central seat 814 of by at least one radial strip 815. The spool 812 comprises a sealing portion 8121 and a sliding rod 8122 fixedly disposed on the sealing portion 8121. The sliding rod 8122 is slidably connected to the central seat 814, and the third elastic body 813 surrounds an outside of the sliding rod 8122 and abuts between the sealing portion 8121 and the central seat 814. The sealing portion 8121 cooperates with the annular protrusion 8112 to control the first water dividing passage 70 to be opened or to be closed. In this embodiment, under an action of the third elastic body 813 and a water pressure of the water inflow passage 30, the sealing portion 8121 abuts the annular protrusion 8112 to seal the annular protrusion 8112 and prevent water from flowing backward. When the operating mechanism 801 abuts the sealing portion to cause the sealing portion to move away from the annular protrusion 8112, the control valve 81 is opened, the first water dividing passage 70 is opened, and the water flows from the water inflow passage 30 into the first water outflow passage 40 through the first water dividing passage 70. In some embodiments, the control valve 81 can also be other mechanisms, for example, an on-off valve. In some embodiments, the control valve 81 can also be disposed between the water inflow passage 30 and the first water dividing passage 70 to control the first water dividing passage 70 to be opened or to be closed.

The operating mechanism 801 comprises an operating portion 82 and a second sliding portion 83 configured to be slidable relative to the fixing portion 10. The operating portion 82 is movably connected to the fixing portion 10, and the operating portion 82 is drivably connected to the second sliding portion 83. The second sliding portion 83 is drivably connected to the control valve 81. The operating portion 82 moves to drive the second sliding portion 83 to slide, and the second sliding portion 83 slides to control the control valve 81 to be opened or to be closed. Preferably, a second elastic body 84 is disposed between the fixing portion 10 and the second sliding portion 83 and abuts the second sliding portion 83 to enable the second sliding portion 83 to be reset. In some embodiments, the second sliding portion 83 of the operating mechanism 801 can also be replaced by a rotating portion, and the control valve 81 may be rotated by the rotating portion.

The operating portion 82 is pivotally connected to the fixing portion 10, and the socket portion 20 and the operating portion 82 are respectively disposed on opposite ends of the fixing portion 10, thereby forming a structure that is simplified and more compact and that has a more beautiful appearance. An inner surface of a first end of the operating portion 82 comprises a guiding surface 821. A first end of the second sliding portion 83 abuts the guiding surface 821. The operating portion 82 rotates to drive the guiding surface 821 to rotate to push the second sliding portion 83 to slide. For example, the guiding surface 821 comprises a spiral surface. The structure is compact and can be quickly switched for convenience, and the structure is labor-saving.

In this embodiment, the first inlet 41 of the first water outflow passage 40 and the second inlet 51 of the second water outflow passage 50 are disposed at intervals and face each other. The water inflow passage 30 is between the first inlet 41 and the second inlet 51. The first water dividing passage 70 comprises a third inlet 71. The second inlet 51 and the first inlet 41 are disposed along the water inflow passage 30 so that a layout is reasonable and compact. The first sliding portion 61 and the second sliding portion 83 are arranged in parallel, and the layout is reasonable and compact.

When being used:

1. When the handheld assembly, such as for example a handheld shower, is pulled out from the socket portion 20 of the fixing portion 10, the movable member 21 moves freely, a restriction of a sliding movement of the first sliding portion 61 is released, the first elastic body 12 pushes the first sliding portion 61 to be reset, the first sealing ring 62 seals the second inlet 51 of the second water outflow passage 50, the water inflow passage 30 is connected to the first inlet 41 of the first water outflow passage 40, the water flows from the water inflow passage 30 into the first water outflow passage 40, and the water flows out from the handheld shower. At this time, a user can rotate the operating portion 82, the guiding surface 821 abuts the second sliding portion 83, the second sliding portion 83 abuts the spool 812, the control valve 81 is opened, and the first water dividing passage 70 is opened. At this time, the water flows into the water inflow passage 30, then flows into the first water dividing passage 70, and then flows out from the first water outflow passage 40. This, a water volume of the handheld shower increases.

2. When the handheld assembly is inserted into the socket portion 20, the handheld assembly drives the movable member 21 to move to push the push block 11 and then to push the first sliding portion 61 to slide, the first sealing ring 62 seals the first inlet 41 of the first water outflow passage 40, the water inflow passage 30 is connected to the second inlet 51 of the second water outflow passage 50, the water flows from the water inflow passage 30 into the second water outflow passage 50, and then flows out from a top spray shower. At this time, the user can rotate the operating portion 82, the guiding surface 821 abuts the second sliding portion 83, the second sliding portion abuts the spool 812, the control valve 81 is opened, and the first water dividing passage 70 is opened. At this time, the water flows into the water inflow passage 30, then flows into the first water dividing passage 70, and then flows out from the first water outflow passage 40. Since the first water outflow passage 40 and the second water outflow passage 50 are opened at the same time, water flows out from the handheld shower and the top spray shower synchronously.

In a specific structure of Embodiment 1:

The fixing portion 10 comprises an annular outer wall 201, an annular inner wall 202 fixedly disposed in the annular outer wall 201, an annular auxiliary wall 203 fixedly disposed in an annular gap of the annular outer wall 201 and the annular inner wall 202, a first connecting portion 204, and a second connecting portion 205.

The annular auxiliary wall 203 comprises a through passage 2031. A first end of the through passage 2031 is connected to an inlet port 2011 of the annular outer wall 201. The annular inner wall 202 comprises a connecting port 2021 extending from an inner surface to an outside surface of the annular inner wall 202, and a second end of the through passage 2031 is connected to the connecting port 2021 to enable the water to flow from the inlet port 2011 into the annular inner wall 202. The annular inner wall 202 comprises a first section 2022 and a second section 2023 disposed on opposite sides of the connecting port 2021. In other words, the annular inner wall 202 comprises the first section 2022 and the second section 2023 on opposite sides of the water inflow passage 30. The water inflow passage 30 comprises the inlet port 2011, the through passage 2031, the connecting port 2021, and a portion disposed between the first section 2022 and the second section 2023 of the annular inner wall 202. The first water outflow passage 40 comprises a water passage defined from the first section 2022 of the annular inner wall 202 to a first outlet joint 42 disposed on an outside of the annular outer wall 201. The second water outflow passage 50 comprises a water passage defined from the second section 2023 of the annular inner wall 202 to a second outlet joint 52 disposed on the outside of the annular outer wall 201.

The annular auxiliary wall 203 comprises a first passage 2032 connected to the water inflow passage 30. In other words, the first passage 2032 is connected to the through passage 2031, and the control valve 81 is disposed in the first passage 2032. The first connecting portion 204 seals and is fixedly disposed in the annular outer wall 201, and the first connecting portion 204 comprises a second passage 2041 aligned with the first passage 2032 and a third passage 2042 aligned with the annular inner wall 202. The second sliding portion 83 seals and is slidingly connected to the second passage 2041, and the second elastic body 84 is disposed between the second sliding portion 83 and the first connecting portion 204. The third passage 2042 corresponds and is partially inserted into the first section 2022 of the annular inner wall 202. A portion of the first sliding portion 61 seals and is slidably disposed in the third passage 2042, and the second elastic body 84 connects the first connecting portion 204 and the second sliding portion 83. A first annular cavity 2043 defined between the first connecting portion 204 and the annular auxiliary wall 203 is connected between the first passage 2032 and the first water outflow passage 40. The first water dividing passage 70 comprises the first annular cavity 2043 and the first passage 2032. The operating portion 82 is pivotally connected to the annular outer wall 201 and is pivotally engaged with the first connecting portion 204.

The second connecting portion 205 seals and is fixedly disposed in the annular outer wall 201. The second connecting portion 205 comprises a fourth passage 2051. The fourth passage 2051 seals and is partially inserted into the second section 2023 of the annular inner wall 202. The first sliding portion 61 seals and is slidably connected to the fourth passage 2051. The second abutting portion 111 extends into the fourth passage 2051 and abuts the first sliding portion 61. A second annular cavity 2052 defined between the second connecting portion 205 and the annular auxiliary wall 203 is connected to the fourth passage 2051, and the second annular cavity 2052 defines a portion of the second water outflow passage 50.

Embodiment 2

Figure 13:
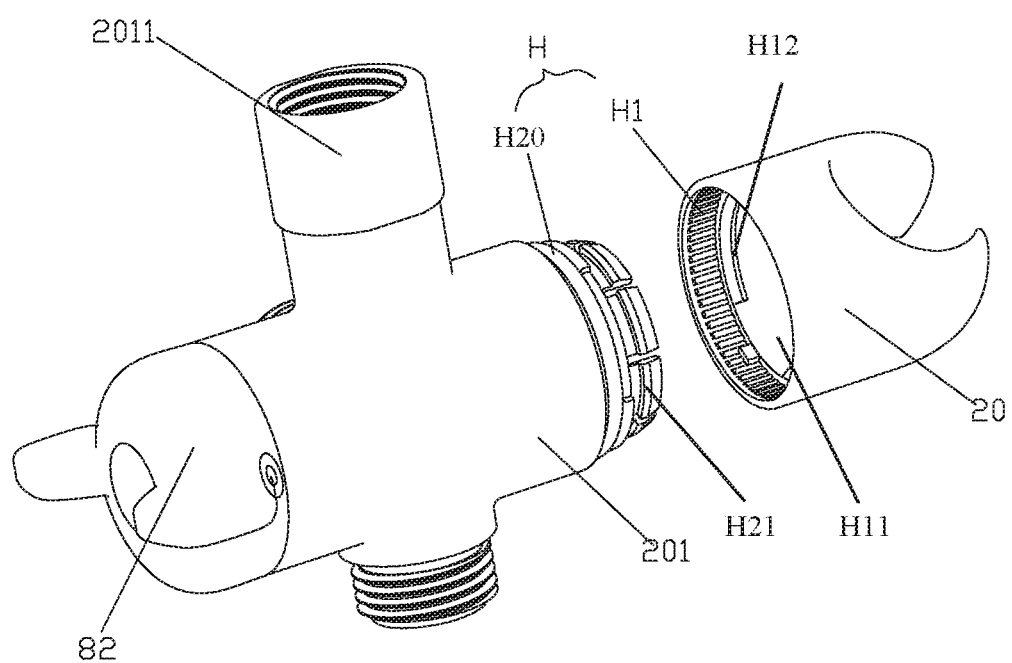
FIG. 13 illustrates an exploded perspective view of a socket device according to Embodiment 2 of the present embodiment.
Figure 14:
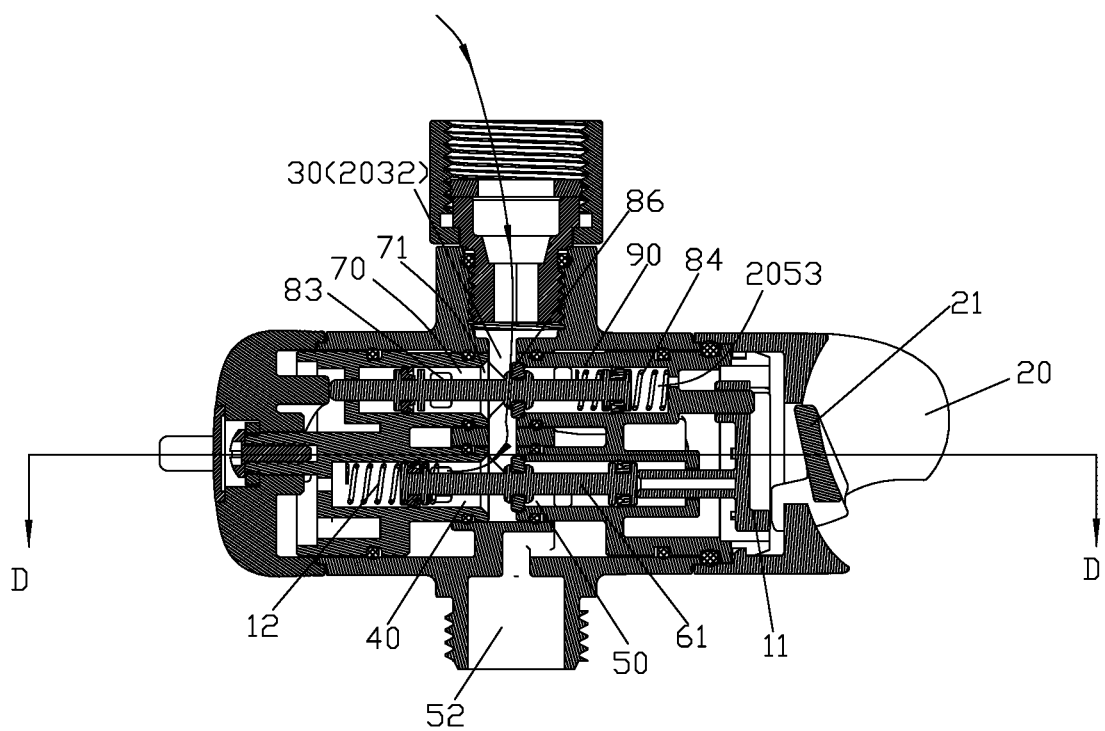
FIG. 14 illustrates a cross-sectional view of the socket device of Embodiment 2 of the present embodiment when a handheld assembly is pulled out from a socket portion of the socket device (the handheld assembly is not shown in FIG. 14).
Figure 15:
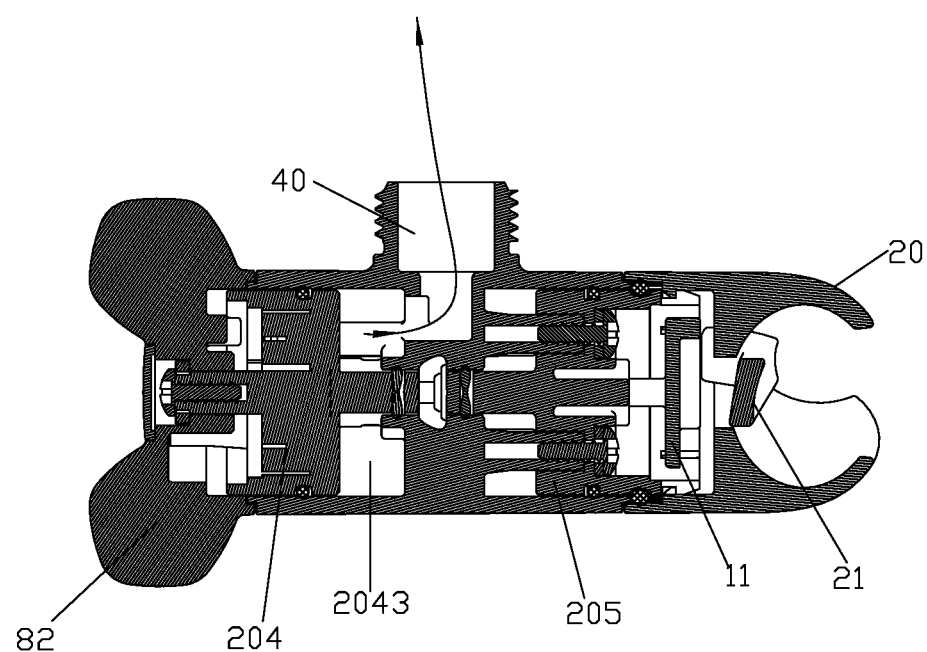
FIG. 15 illustrates a cross-sectional view taken along line D-D of FIG. 14.
Figure 16:
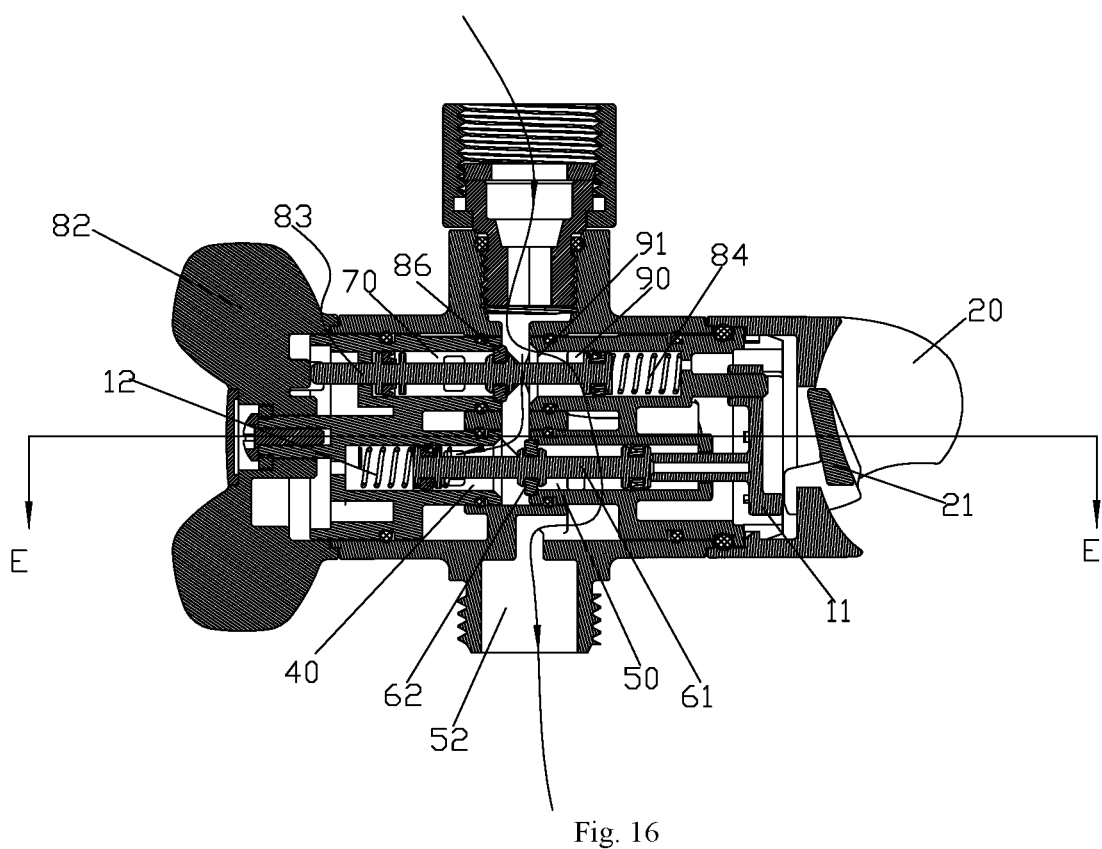
FIG. 16 illustrates a cross-sectional view showing the socket device of Embodiment 2 of the present disclosure when the handheld assembly is pulled out from the socket portion of the socket device and water flows out from a top spray shower and a handheld shower synchronously (the handheld assembly is not shown in FIG. 16).
Figure 17:
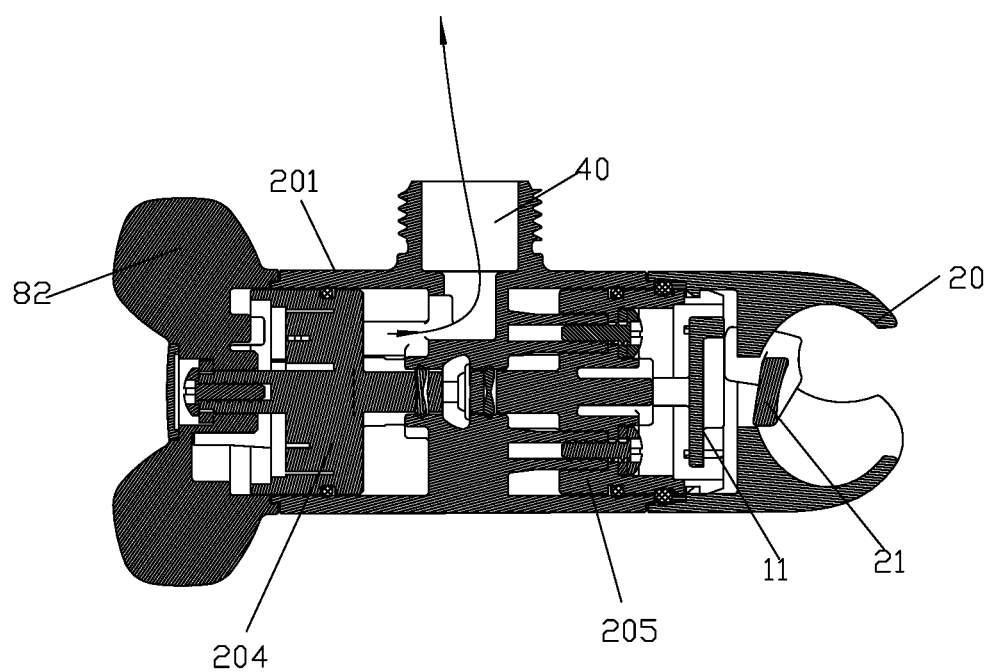
FIG. 17 illustrates a cross-sectional view taken along line E-E of FIG. 16.
Figure 18:
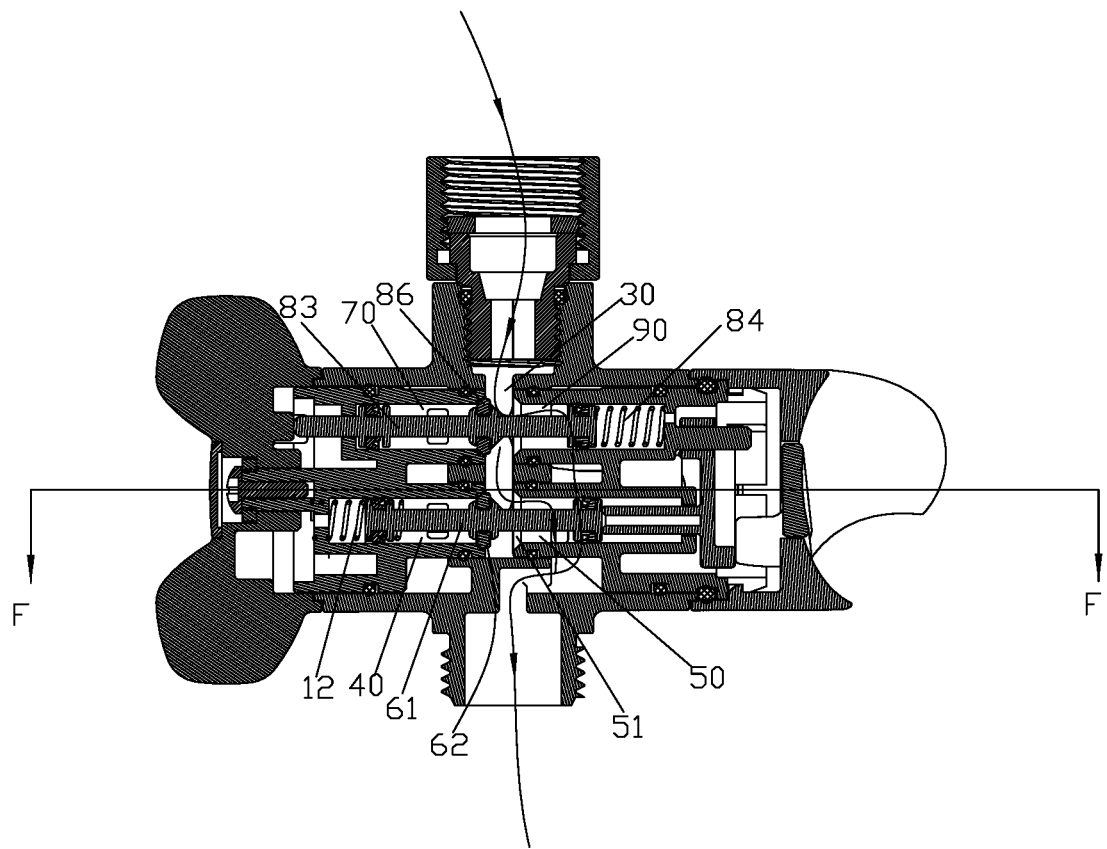
FIG. 18 illustrates a cross-sectional view of the socket device of Embodiment 2 of the present disclosure when the handheld assembly is inserted into the socket portion of the socket device (the handheld assembly is not shown in FIG. 18).
Figure 19:
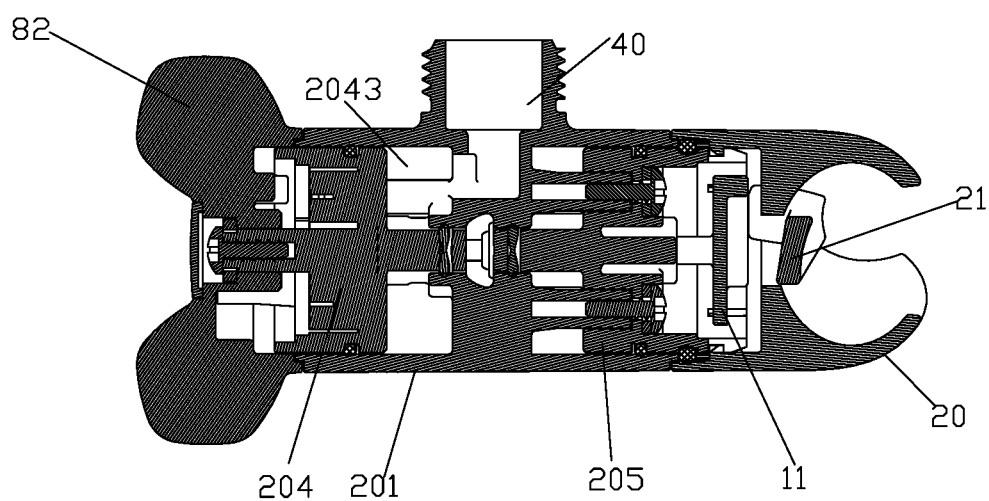
FIG. 19 illustrates a cross-sectional view taken along line F-F of FIG. 18.
Figure 20:
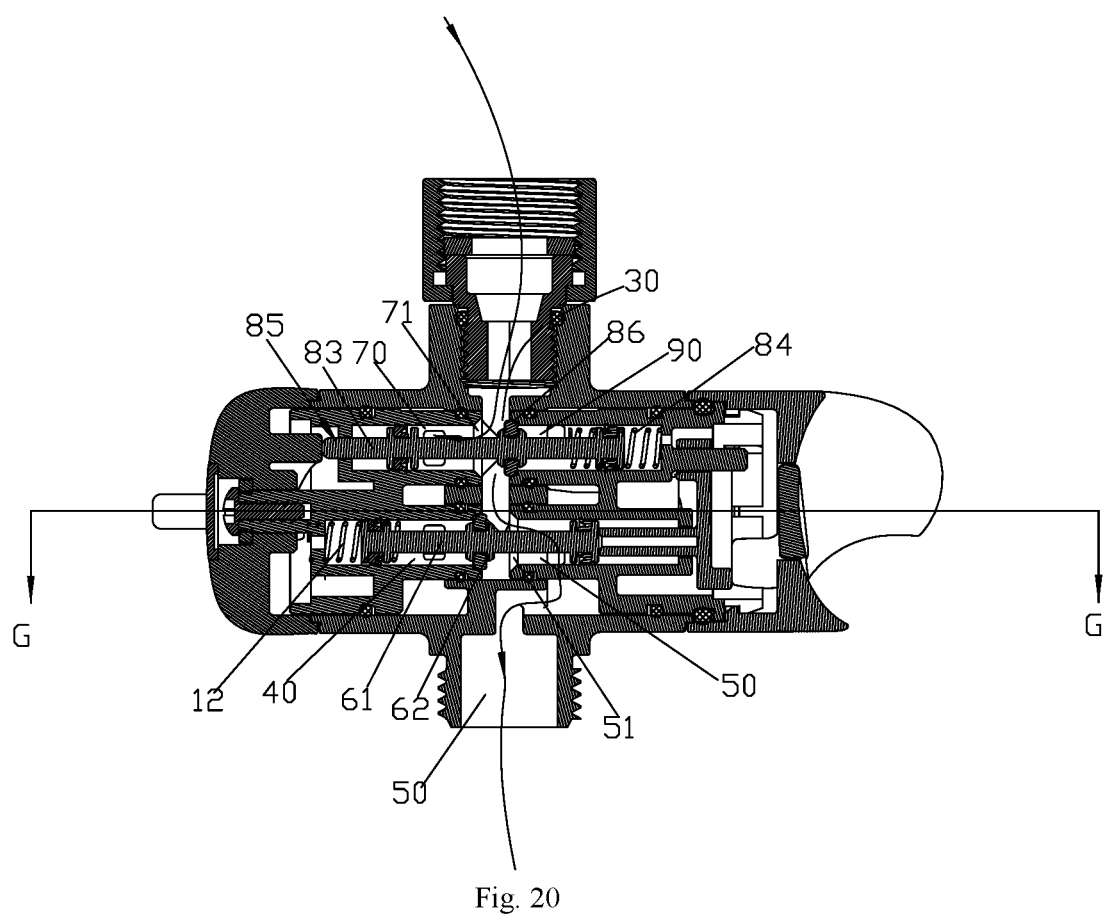
FIG. 20 illustrates a cross-sectional view of the socket device of Embodiment 2 of the present disclosure when the handheld assembly is inserted into the socket portion of the socket device and water flows out from the top spray shower and the handheld shower synchronously (the handheld assembly is not shown in FIG. 20).
Figure 21:
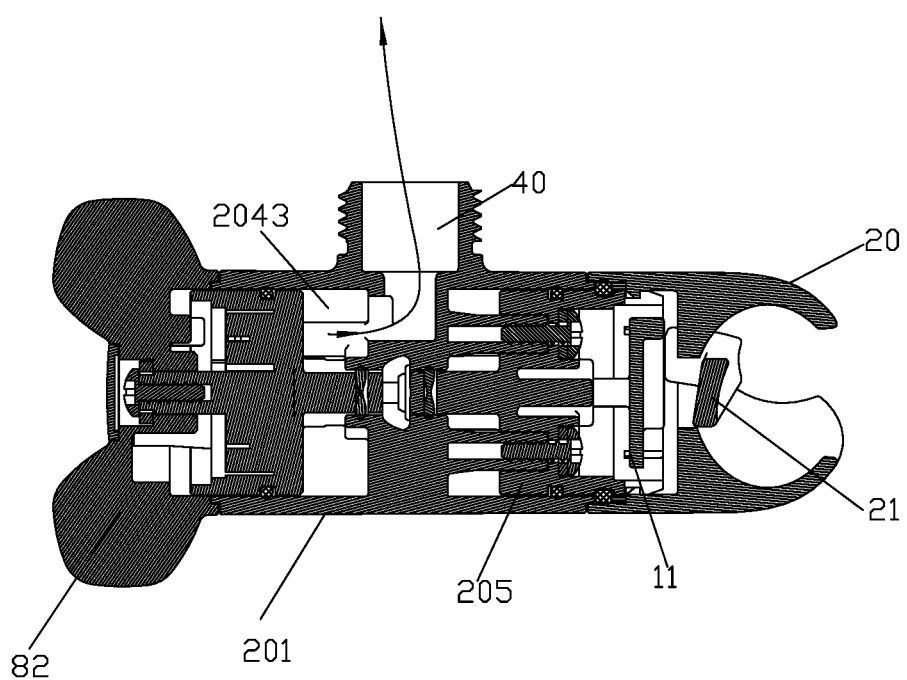
FIG. 21 illustrates a cross-sectional view taken along line G-G of FIG. 20.

Referring to FIGS. 13-21, differs from the socket device of the Embodiment 1, in that the fixing portion 10 is further disposed with a second water dividing passage 90, and the second water dividing passage 90 is connected to the water inflow passage 30 and the second water outflow passage 50. The first control mechanism 80 switches the first water dividing passage 70 or the second water dividing passage 90 to connect to the water inflow passage 30. The first control mechanism 80 comprises a second switching mechanism 85 and an operating portion 82. The second switching mechanism 85 is connected to the first water dividing passage 70, the second water dividing passage 90, and the water inflow passage 30, and the operating portion 82 is drivably connected to the second switching mechanism 85 to enable switching. The second switching mechanism 85 comprises a second sliding portion 83 configured to be slidable relative to the fixing portion 10. The operating portion 82 is drivably connected to the second sliding portion 83, and the first water dividing passage 70 and the second water dividing passage 90 are switched to be connected to the water inflow passage 30 by a sliding movement of the second sliding portion 83. Preferably, the second switching mechanism 85 further comprises a second sealing ring 86 fixedly disposed on the second sliding portion 83, and the third inlet 71 of the first water dividing passage 70 and a fourth inlet 91 of the second water dividing passage 90 are disposed at intervals and face each other. The water inflow passage 30 is disposed between the third inlet 71 and the fourth inlet 91, and the second sealing ring 86 is disposed between the third inlet 71 and the fourth inlet 91 and corresponds to the third inlet 71 and the fourth inlet 91. When the second sealing ring 86 seals one of the third inlet 71 or the fourth inlet 91, the other one of the third inlet 71 or the fourth inlet 91 is connected to the water inflow passage 30. The second elastic body 84 is disposed between the second sliding portion 83 and the fixing portion 10 to enable the second sliding portion 83 to be reset. A group of the first inlet 41 and the second inlet 51, and a group of the third inlet 71 and the fourth inlet 91 are disposed along the water inflow passage 30 at intervals, and the structure is simplified and compact.

The second connecting portion 205 comprises a fifth passage 2053. A portion of the second sliding portion 83 seals and is slidingly connected to the fifth passage 2053, and the second elastic body 84 is disposed between the second sliding portion 83 and the second connecting portion 205. The second annular cavity 2052 connects the fifth passage 2053 and the second water outflow passage 50, and the second water dividing passage 90 comprises the fifth passage 2053 and the second annular cavity 2052. If the socket portion 20 is pivotally connected the fixing portion 10 and a damper H is disposed between the socket portion 20 and the fixing portion 10, a structure of the damper H is as follows. The socket portion 20 comprises a sleeve hole H11, and the sleeve hole H11 surrounds an outside of the fixing portion 10. An inner side of the sleeve hole H11 comprises a gear H1, and an elastic ring H20 surrounds an outer side of the fixing portion 10. The elastic ring H20 is, for example, an O-ring. The elastic ring H20 and the gear H1 cooperate to achieve a damping function. The sleeve hole H11 comprises a lock member H12. The fixed base comprises a fastener H21. The lock member H12 and the fastener H21 cooperate to achieve a clamp connection. By structural design, a circumferential rotation can be realized between the lock member H12 and the fastener H21, but axial movement cannot be realized. That is, the above-mentioned clamp connection and the above-mentioned circumferential rotation are matched. The elastic ring H20 and the gear H1 are to improve stability. Interference by the O-ring and the gear can be reduced relative to an interference of a conventional cooperation of the O-ring and a plane, so as to facilitate assembly. An end of the first abutting portion 212 of the movable member 21 comprises at least one external hook portion 213. The at least one external hook portion 213 abuts an inner wall of the socket portion 20 to prevent the movable member 21 from being separated from the socket portion 20.

When being used:

1. When the handheld assembly, such as for example a handheld shower, is pulled out from the socket portion 20 of the fixing portion 10, the movable member 21 moves freely, the restriction of the sliding movement of the first sliding portion 61 is released, the first elastic body 12 pushes the first sliding portion 61 to be reset, the first sealing ring 62 seals the second inlet 51 of the second water outflow passage 50, the water inflow passage 30 is connected to the first inlet 41 of the first water outflow passage 40, the water flows from the water inflow passage 30 into the first water outflow passage 40, and the water flows out from the handheld shower. At this time, the operating portion 82 is rotated to control the second sliding portion 83 to slide to control the first water dividing passage 70 or the second water dividing passage 90 to be connected to the water inflow passage 30. If the first water dividing passage 70 is connected to the water inflow passage 30, the water flows from the water inflow passage 30, then flows into the first water dividing passage 70, and then flows out from the first water outflow passage 40. In other words, a flow volume of the first outflow passage 40 is increased, and a flow volume of the handheld shower is increased. If the second water dividing passage 90 is connected to the water inflow passage 30, water flows from the water inflow passage 30, then flows into the second water dividing passage 90, and then flows out from the second water outflow passage 50. In other words, the water flows out from the first water outflow passage 40 and the second water outflow passage 50 synchronously to enable the water to flow out from the top spray shower and the handheld shower synchronously.

2. When handheld assembly is inserted into the socket portion 20, the handheld assembly drives the movable member 21 to move to push the push block 11 and then to push the first sliding portion 61 to slide, the first sealing ring 62 seals the first inlet 41 of the first water outflow passage 40, the water inflow passage 30 is connected to the second inlet 51 of the second water outflow passage 50, the water flows from the water inflow passage 30 into the second water outflow passage 50, and then the water flows out from the top spray shower. At this time, the operating portion 82 is rotated to control the second sliding portion 83 to slide to control the first water dividing passage 40 or the second water dividing passage 50 to be connected to the water inflow passage 30. When the first water dividing passage 70 is connected to the water inflow passage 30, water flows from the water inflow passage 30, then flows into the first water dividing passage 70, and then flows out from the first outflow passage 40. In other words, the water flows out from the first water outflow passage 40 and the second water outflow passage 50 synchronously to enable the water to flow out from the top spray shower and the handheld shower synchronously. When the second water dividing passage 90 is connected to the water inflow passage 30, water flows from the water inflow passage 30, then flows into the second water dividing passage 90, and then flows out from the second water outflow passage 50. In other words, the flow volume of the second water outflow passage 50 is increased, and the flow volume of the top spray shower is increased.

In another embodiment, differing from Embodiment 2, the socket device further comprises a second control mechanism. The second control mechanism is configured to control the second water dividing passage 90 to be connected to the water inflow passage 30, and the second control mechanism is the same as the first control mechanism 80 of the first water dividing passage 70.

It will be apparent to those skilled in the art that various modifications and variation can be made in the present disclosure without departing from the spirit or scope of the invention. Thus, it is intended that the present disclosure cover the modifications and variations of this invention provided they come within the scope of the appended claims and their equivalents.

What is claimed is:

1. A socket device, comprising:
a fixing portion, wherein:
the fixing portion comprises a socket portion, a water inflow passage, a first water outflow passage, a second water outflow passage, a first switching mechanism, a first water dividing passage, and a first control mechanism,
the socket portion comprises a switch,
the first switching mechanism is connected to the water inflow passage, the first water outflow passage, and the second water outflow passage,
the first water outflow passage and the second water outflow passage are switched to be connected to the water inflow passage by the first switching mechanism,
the switch is connected to the first switching mechanism to drive the first switching mechanism,
the first water dividing passage is connected to the water inflow passage and the first water outflow passage,
the first control mechanism is configured to control the water inflow passage to be connected to the first water dividing passage or control the first water dividing passage to be opened or to be closed,
the first control mechanism comprises a control valve and an operating mechanism,
the control valve is disposed in the first water dividing passage to prevent water from flowing backward into the water inflow passage, and
the operating mechanism is drivably connected the control valve and is configured to open the control valve.

2. The socket device according to claim 1, wherein:
the first switching mechanism comprises a first sliding portion slidably disposed in the fixing portion, and
the first water outflow passage and the second water outflow passage are switched by the first sliding portion to be connected to the water inflow passage.

3. The socket device according to claim 2, wherein:
the first switching mechanism further comprises a first sealing ring fixedly disposed on the first sliding portion,
a first inlet of the first water outflow passage and a second inlet of the second water outflow passage are disposed at intervals and face each other,
the water inflow passage is disposed between the first inlet and the second inlet,
the first sealing ring is disposed between the first inlet and the second inlet and corresponds to the first inlet and the second inlet, and
when the first sealing ring seals one of the first inlet or the second inlet, the other of the first inlet or the second inlet is connected to the water inflow passage.

4. The socket device according to claim 1, wherein:
the switch comprises a movable member movably connected to the socket portion,
the movable member is coupled to the first switching mechanism, and
when a handheld assembly is inserted into the socket portion or when the handheld assembly is pulled out from the socket portion, the movable member moves relative to the socket portion to trigger the first switching mechanism.

5. The socket device according to claim 1, wherein:
the first switching mechanism comprises a first sliding portion slidably disposed in the fixing portion,
the first water outflow passage and the second water outflow passage are switched by the first sliding portion to be connected to the water inflow passage,
the switch comprises a movable member movably connected to the socket portion,
the movable member is coupled to the first sliding portion, and
when a handheld assembly is inserted into the socket portion or when the handheld assembly is pulled out from the socket portion, the movable member moves relative to the socket portion to trigger the first sliding portion to slide.

6. The socket device according to claim 5, wherein:
the movable member is swingably connected to the socket portion, and
the movable member abuts against the first switching mechanism to push the first switching mechanism to slide.

7. The socket device according to claim 6, wherein:
the fixing portion is further slidably connected to a push block, and
the push block abuts between the first switching mechanism and the movable member.

8. The socket device according to claim 5, wherein:
the socket portion defines a socket space,
the movable member moves relative to the socket portion between a pull-out position and an inserted position, and
when the movable member is at the pull-out position, the movable member at least partially protrudes into the socket space.

9. The socket device according to claim 1, wherein:
a first elastic body is disposed between the first switching mechanism and the fixing portion,
the first elastic body accumulates energy when a handheld assembly is inserted into the socket portion, and
when the handheld assembly is pulled out from the socket portion, the first elastic body releases the energy to reset the first switching mechanism.

10. The socket device according to claim 1, wherein:
the operating mechanism comprises an operating portion and a second sliding portion configured to be slidable relative to the fixing portion,
the operating portion is movably connected to the fixing portion,
the operating portion is drivably connected to the second sliding portion, and
the second sliding portion is drivably connected to the control valve.

11. The socket device according to claim 10, wherein a second elastic body is disposed between the fixing portion and the second sliding portion and abuts the second sliding portion.

12. The socket device according to claim 10, wherein:
the first switching mechanism comprises a first sliding portion slidably disposed in the fixing portion,
the first water outflow passage and the second water outflow passage are switched by the first sliding portion to be connected to the water inflow passage, and
the first sliding portion and the second sliding portion are arranged in parallel.

13. The socket device according to claim 10, wherein:
the operating portion is rotatably connected to the fixing portion,
an inner surface of the operating portion comprises a guiding surface, a first end of the second sliding portion abuts the guiding surface, and the operating portion rotates to drive the guiding surface to rotate to push the second sliding portion to slide.

14. The socket device according to claim 1, wherein:

the control valve comprises a spool movable relative to the fixing portion and a third elastic body abutting the spool, the spool controls the first water dividing passage to be opened and to be closed, and the operating mechanism is connected to the spool.

15. The socket device according to claim 1, wherein:

a first inlet of the first water outflow passage and a second inlet of the second water outflow passage are disposed at intervals and face each other, the water inflow passage is disposed between the first inlet and the second inlet, the first water dividing passage comprises a third inlet, and a group of the first inlet and the second inlet, and the third inlet are disposed along the water inflow passage at intervals.

16. The socket device according to claim 1, wherein:

the fixing portion further comprises a second water dividing passage, and the socket device further comprises a second control mechanism configured to control the second water dividing passage to be connected to the water inflow passage.

17. The socket device according to claim 1, wherein:

the socket portion is pivotably connected to the fixing portion and is configured to be rotated in a preset angle, the switch comprises a movable member movably connected to the socket portion, the fixing portion is further slidably connected with a push block, the push block abuts between the first switching mechanism and the movable member, and the movable member always corresponds to the push block when the socket portion is rotated within the preset angle.

18. A socket device, comprising:

a fixing portion, wherein:

the fixing portion comprises a socket portion, a water inflow passage, a first water outflow passage, a second water outflow passage, a first switching mechanism, a first water dividing passage, and a first control mechanism, the socket portion comprises a switch, the first switching mechanism is connected to the water inflow passage, the first water outflow passage, and the second water outflow passage, the first water outflow passage and the second water outflow passage are switched to be connected to the water inflow passage by the first switching mechanism, the switch is connected to the first switching mechanism to drive the first switching mechanism, the first water dividing passage is connected to the water inflow passage and the first water outflow passage, the first control mechanism is configured to control the water inflow passage to be connected to the first water dividing passage or control the first water dividing passage to be opened or to be closed, the fixing portion further comprises a second water dividing passage, and the socket device further comprises a second control mechanism configured to control the second water dividing passage to be connected to the water inflow passage.

19. A socket device, comprising:

a fixing portion, wherein:

the fixing portion comprises a socket portion, a water inflow passage, a first water outflow passage, a second water outflow passage, a first switching mechanism, a first water dividing passage, and a first control mechanism, the socket portion comprises a switch, the first switching mechanism is connected to the water inflow passage, the first water outflow passage, and the second water outflow passage, the first water outflow passage and the second water outflow passage are switched to be connected to the water inflow passage by the first switching mechanism, the switch is connected to the first switching mechanism to drive the first switching mechanism, the first water dividing passage is connected to the water inflow passage and the first water outflow passage, the first control mechanism is configured to control the water inflow passage to be connected to the first water dividing passage or control the first water dividing passage to be opened or to be closed, the first switching mechanism comprises a first sliding portion slidably disposed in the fixing portion, the first water outflow passage and the second water outflow passage are switched by the first sliding portion to be connected to the water inflow passage, the switch comprises a movable member movably connected to the socket portion, the movable member is coupled to the first sliding portion, the movable member is swingably connected to the socket portion, the movable member abuts against the first switching mechanism to push the first switching mechanism to slide, the fixing portion is further slidably connected to a push block, the push block abuts between the first switching mechanism and the movable member, and when a handheld assembly is inserted into the socket portion or when the handheld assembly is pulled out from the socket portion, the movable member moves relative to the socket portion to trigger the first sliding portion to slide.

* * * * *